(12) United States Patent
Han

(10) Patent No.: US 8,080,914 B2
(45) Date of Patent: Dec. 20, 2011

(54) TORQUE GENERATING DEVICE

(76) Inventor: Dong goo Han, Incheon (KR)

( * ) Notice: Subject to any disclaimer, the term of this patent is extended or adjusted under 35 U.S.C. 154(b) by 360 days.

(21) Appl. No.: 12/550,819

(22) Filed: Aug. 31, 2009

(65) Prior Publication Data
US 2011/0050019 A1    Mar. 3, 2011

(51) Int. Cl.
*H02K 1/17*  (2006.01)
*H02K 1/27*  (2006.01)
*H02K 1/34*  (2006.01)
*H02K 53/00* (2006.01)

(52) U.S. Cl. ............... 310/152; 310/154.01; 310/154.29; 310/156.01; 310/261.1

(58) Field of Classification Search ............. 310/154.01, 310/154.21, 154.28, 154.29, 156.01, 156.16, 310/254.1, 261.1, 152, 153, 157
See application file for complete search history.

(56) References Cited

U.S. PATENT DOCUMENTS

| | | | |
|---|---|---|---|
| 6,274,959 B1 * | 8/2001 | Uchiyama | 310/152 |
| 6,433,452 B1 * | 8/2002 | Graham | 310/152 |
| 7,816,829 B2 * | 10/2010 | Jung | 310/152 |

FOREIGN PATENT DOCUMENTS

| | | | |
|---|---|---|---|
| DE | 4424525 A1 | * | 1/1995 |
| FR | 2676148 | * | 11/1992 |
| JP | 02-023077 A | * | 2/1990 |
| WO | 9311599 A1 | * | 6/1993 |

* cited by examiner

*Primary Examiner* — Burton Mullins
(74) *Attorney, Agent, or Firm* — Cantor Colburn LLP

(57) ABSTRACT

Disclosed herein is a rotation power generating device. The rotation power generating device includes a stator consisting of a plurality of stationary units vertically connected to one another, and a rotator consisting of a plurality of rotating units vertically connected to one another with an angular orientation difference therebetween. Each of the stationary units has a pair of stationary magnets symmetrically embedded inside an inner surface thereof. Each of the rotating units has a pair of rotating magnets and is adapted to be rotated along the inner surface of the corresponding stationary unit about a rotating shaft that is installed in the center of the stator. The rotation power generating device compensates for energy loss of initially acting torque using repulsive force between magnets of the same polarity, resulting in reduced power loss and more effective transmission of energy.

9 Claims, 6 Drawing Sheets

TORQUE GENERATING DEVICE

BACKGROUND OF THE INVENTION

1. Field of the Invention

The present invention relates to a rotation power generating device, and more particularly, to a rotation power generating device devised to compensate for energy loss of initially acting torque via repulsive force between magnets of the same polarity.

2. Description of the Related Art

As is generally known, transmitting initially generated power with a lower degree of energy loss has become a major concern for power generating devices.

A variety of systems have been researched and developed to realize the above-described goal. Practically, technical improvements capable of minimizing energy loss have been accomplished in many fields.

In particular, most conventionally developed technologies have focused on reducing energy loss by adjusting a rotation cycle while restricting friction against torque. However, improvement of these technologies exhibits many limits and therefore, there are highlighted technologies to compensate for energy loss using natural force.

SUMMARY OF THE INVENTION

Therefore, the present invention has been made in view of the above problem, and it is an object of the present invention to provide a rotation power generating device, which may compensate for energy loss of initially acting torque via repulsive force between magnets of the same polarity, thereby achieving reduced power loss.

In accordance with the present invention, the above and other objects can be accomplished by the provision of a rotation power generating device including a stator including a plurality of stationary units shaped into rings of the same diameter and vertically connected to one another, each of the stationary units having a pair of stationary magnets embedded inside an inner surface thereof at symmetric positions such that identical polarities face each other, a portion of the inner surface covering each stationary magnet installed to protrude inward defining a gentle streamlined surface within a predetermined angular range at one side thereof and a vertical end surface at the other side thereof, and a rotator including a plurality of rotating units vertically connected to one another with an angular orientation difference therebetween and each having a pair of rotating magnets arranged to face the corresponding stationary magnets of the same polarity so as to be rotated along the inner surface of the corresponding stationary unit, with a gap from the inner surface, about a rotating shaft that is installed in the center of the stator, each of the rotating magnets being provided at a distal end thereof with a ball bearing to be smoothly rotated on the streamlined surface in close contact therewith, and being connected to the rotating shaft via an elastic member in which a spring is installed.

The pair of symmetric stationary magnets of each stationary unit and the pair of symmetric rotating magnets of the corresponding rotating unit may be offset at positions deviated by a predetermined range from accurately symmetric positions thereof.

A blower fan may be coupled to one end of the rotating shaft at one distal end of the stator.

A power source to provide initial torque may be coupled to one distal end of the rotating shaft of the rotator, and a generator to generate electricity using rotation power may be coupled to the other distal end of the rotating shaft.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, exemplary embodiments of the present invention will be described in detail with reference to the accompanying drawings.

Figure 1:
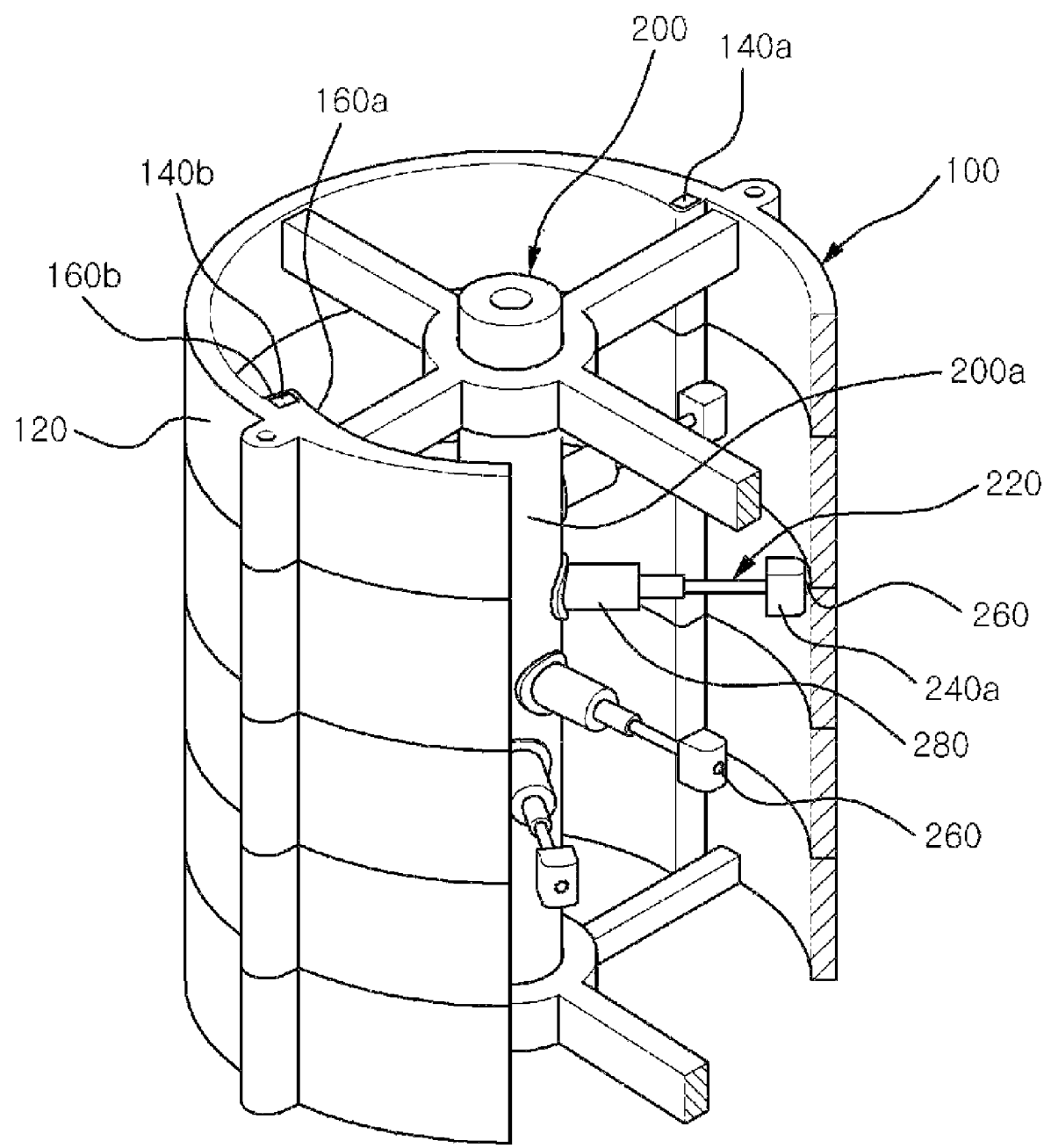
FIG. 1 is a perspective view illustrating a rotation power generating device according to an exemplary embodiment of the present invention.
Figure 2:
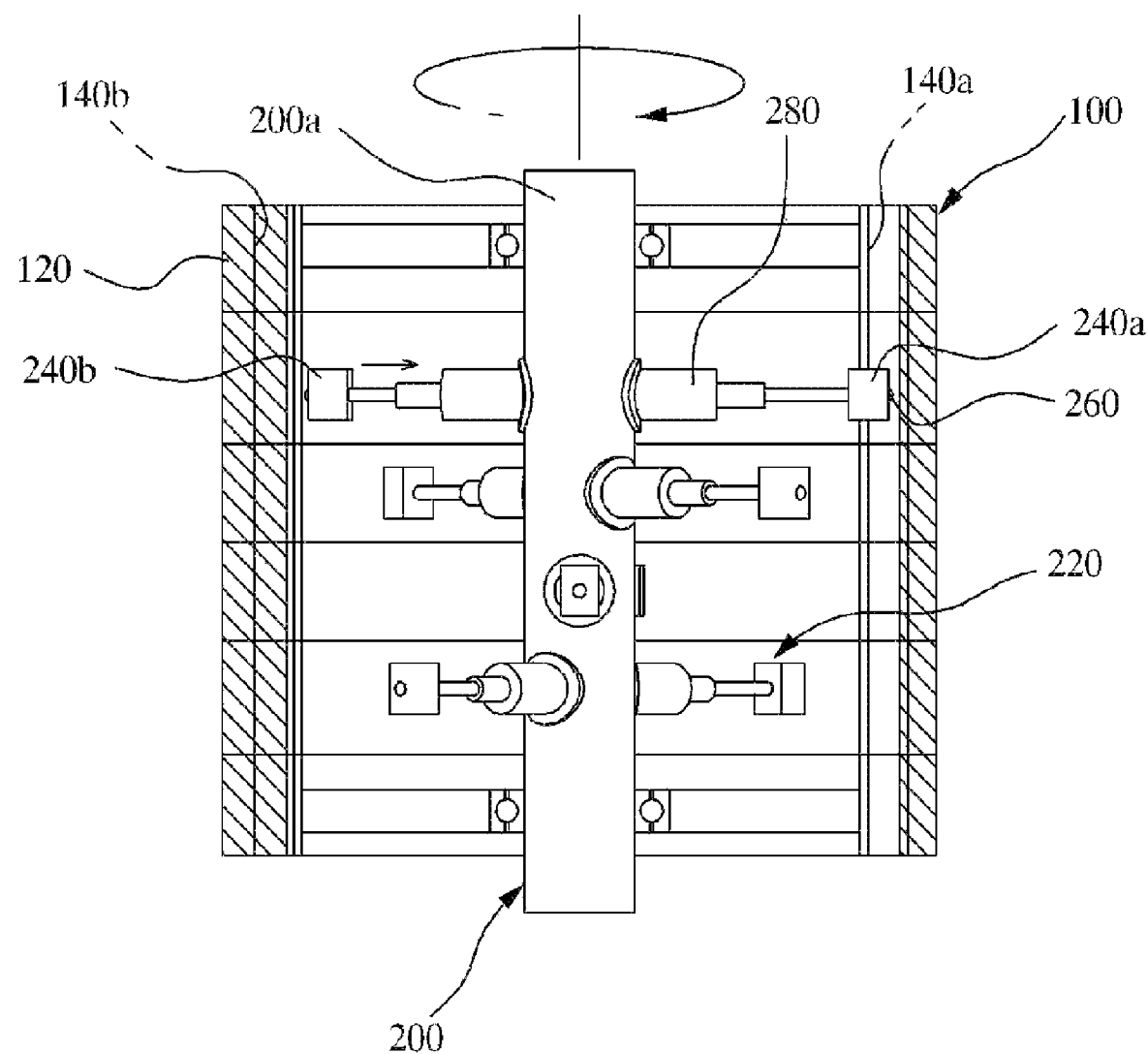
FIG. 2 is a longitudinal sectional view of the rotation power generating device shown in FIG. 1.
Figure 3:
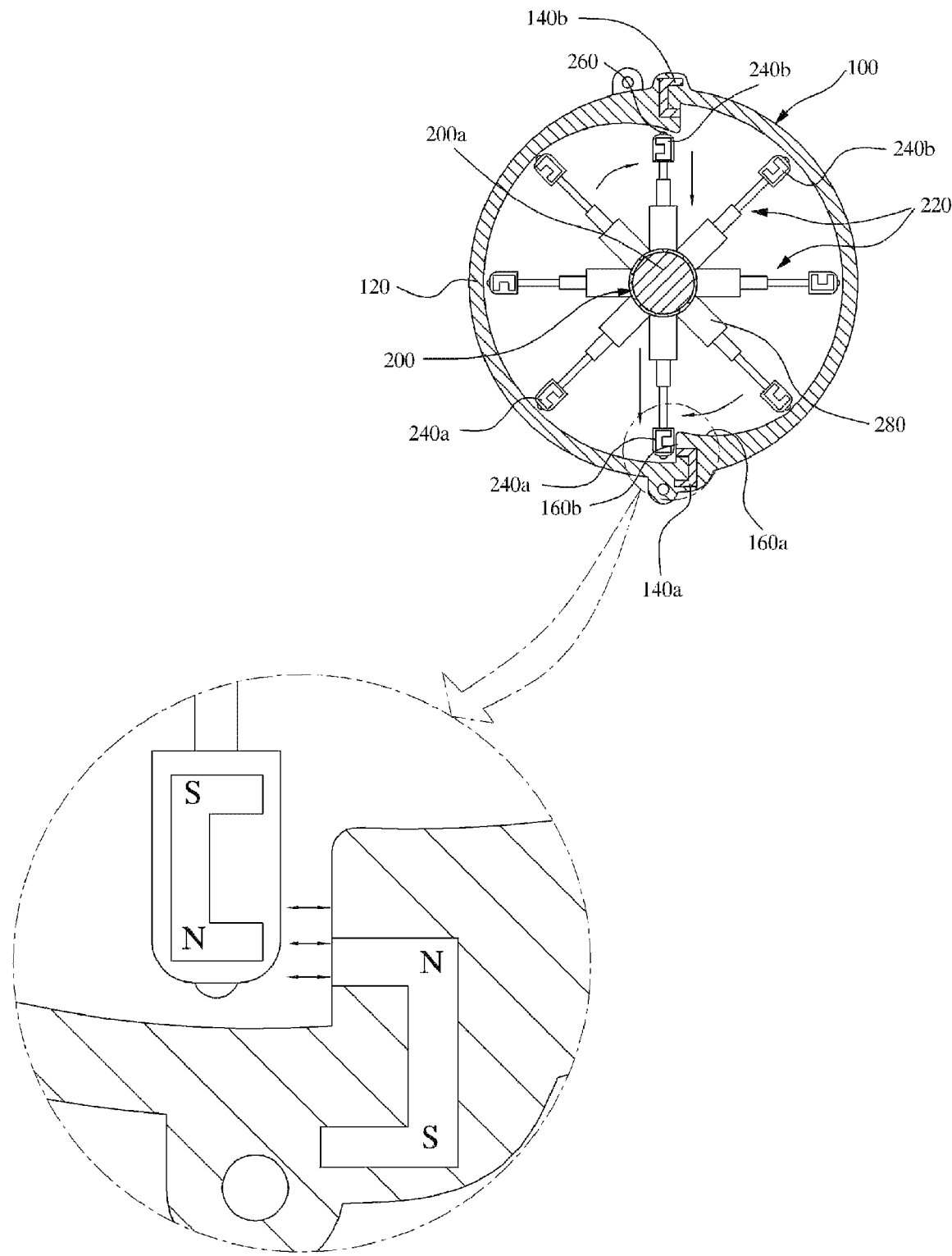
FIG. 3 is a cross sectional view of the rotation power generating device shown in FIG. 1.
Figure 4:
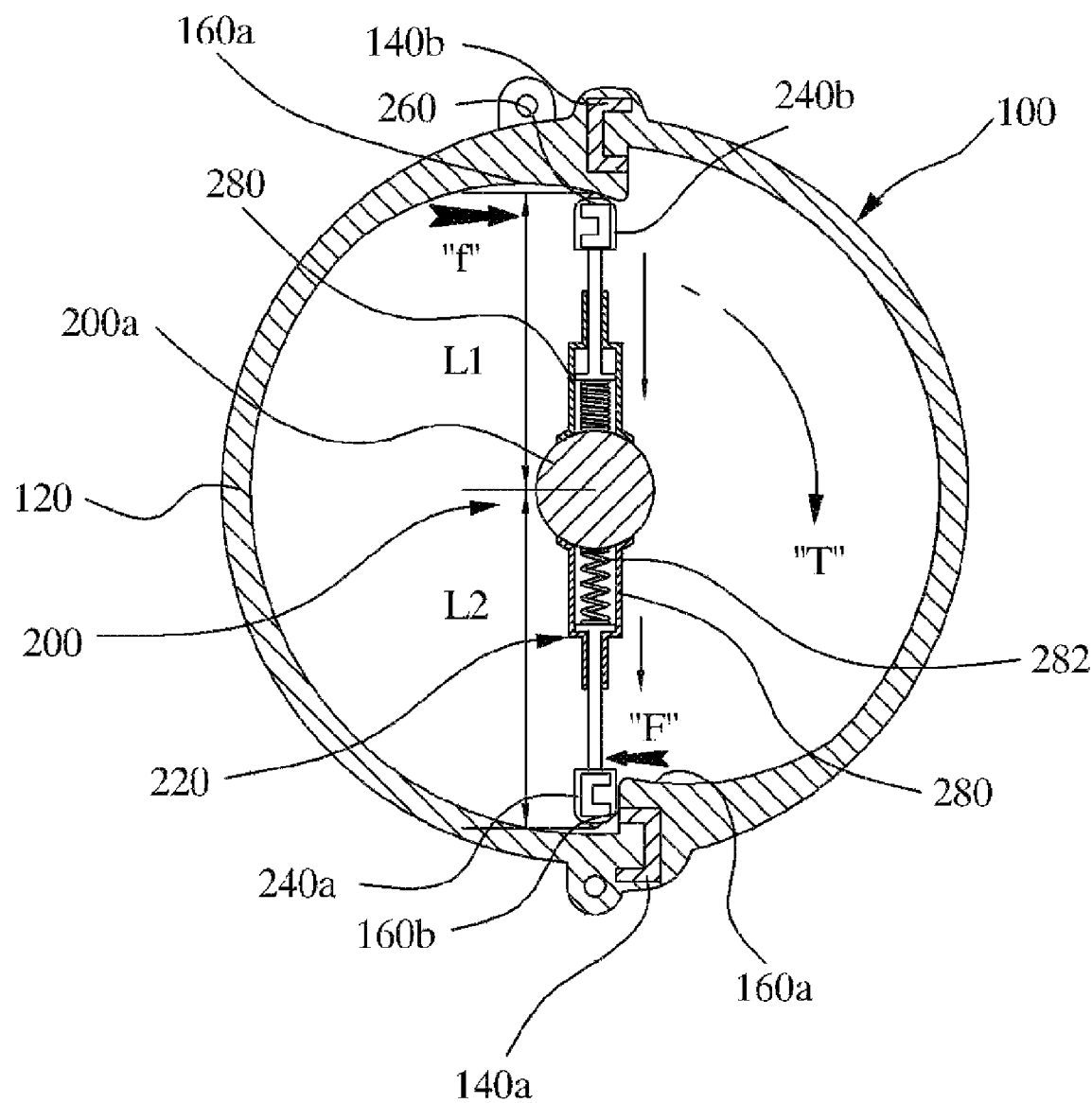
FIG. 4 is a view illustrating operation of the rotation power generating device according to the embodiment of the present invention.
Figure 5:
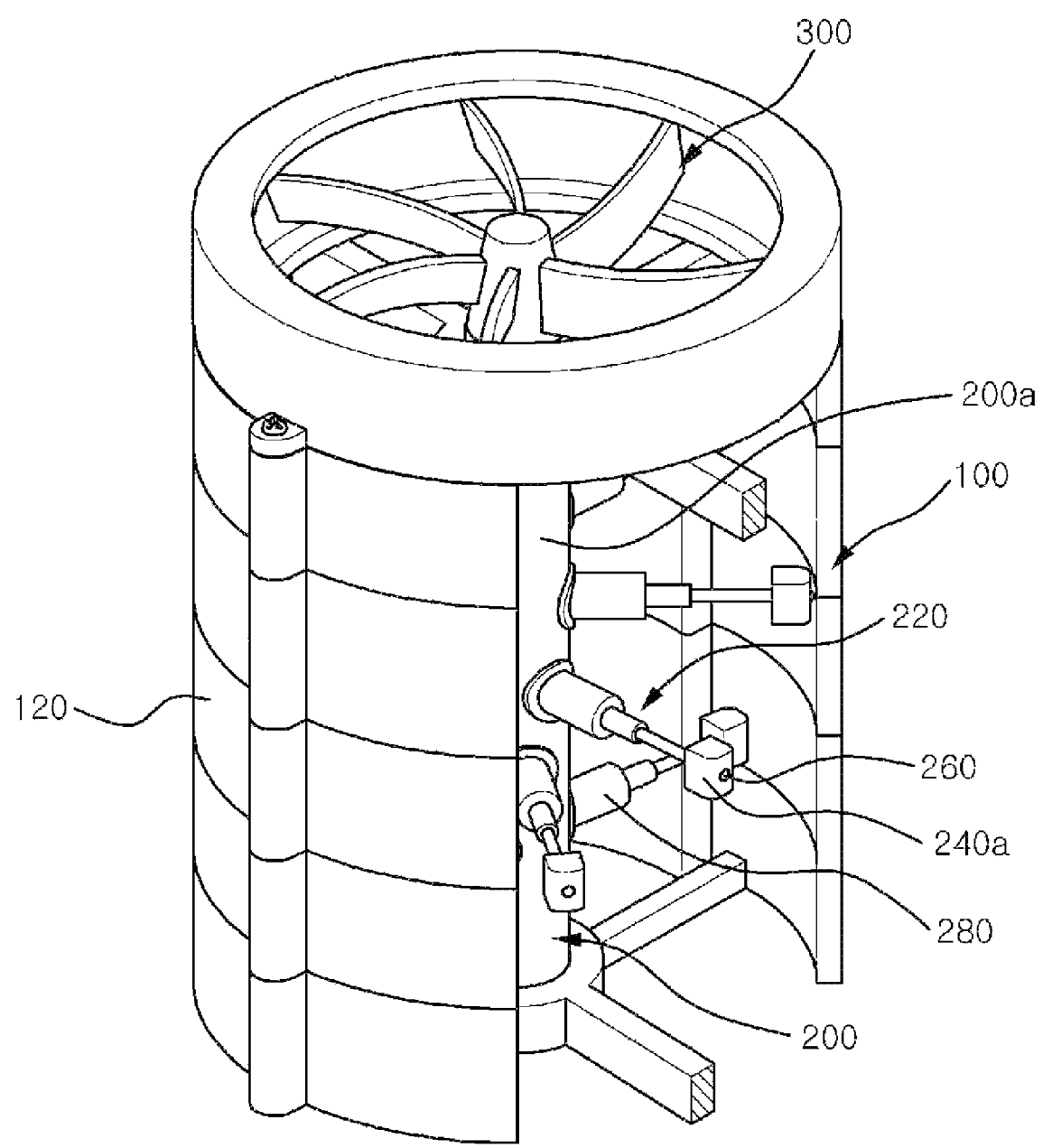
FIG. 5 is a perspective view illustrating a rotation power generating device according to another embodiment of the present invention.
Figure 6:
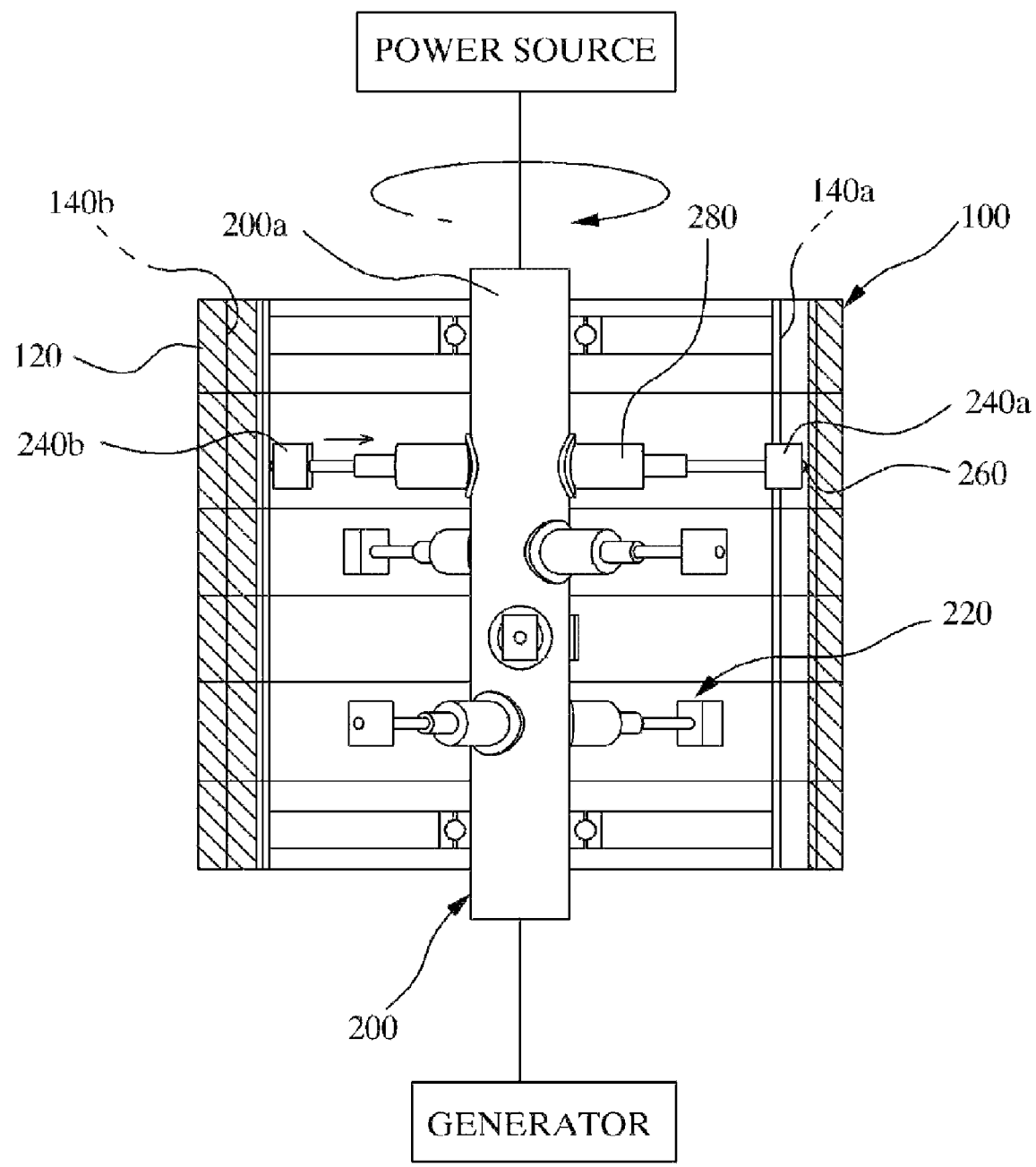
FIG. 6 is a view illustrating an application of the rotation power generating device according to the present invention.

FIG. 1 is a perspective view illustrating a rotation power generating device according to an exemplary embodiment of the present invention. FIG. 2 is a longitudinal sectional view of the rotation power generating device shown in FIG. 1, and FIG. 3 is a cross sectional view of the rotation power generating device shown in FIG. 1. FIG. 4 is a view illustrating operation of the rotation power generating device according to the embodiment of the present invention. Also, FIG. 5 is a perspective view illustrating a rotation power generating device according to another embodiment of the present invention. FIG. 6 is a view illustrating an application of the rotation power generating device according to the present invention.

The rotation power generating device of the present invention, as shown in FIGS. 1 to 6, basically includes a stator 100 and a rotator 200. The stator 100 consists of a plurality of stationary units 120 vertically connected to one another, and each of the stationary units 120 has a pair of stationary magnets 140a and 140b symmetrically embedded inside an inner surface thereof. The rotator 200 consists of a plurality of rotating units 220 vertically connected to one another with an angular orientation difference therebetween. Each of the rotating units 220 is adapted to be rotated along the inner surface of the corresponding stationary unit 120 about a rotating shaft 200a that is installed in the center of the stator 100. For this, the rotating unit 220 has a pair of rotating magnets 240a and 240b.

The stator 100, as described above, is constructed by vertically connecting the plurality of stationary units 120. The reason that the stator 100 is divided into the plurality of stationary units 120 is to allow the respective stationary units 120 to be coupled one above another with an angular orientation difference therebetween as necessary, although the respective stationary units 120 may be vertically coupled to one another with the same orientation as shown in the drawings.

The stationary units 120 take the form of rings having the same diameter. The pair of stationary magnets 140a and 140b is embedded inside the inner surface of each of the stationary units 120 at symmetric positions, such that identical polarities face each other. In this case, the stationary magnets 140a and 140b protrude inward of the stationary unit 120 and thus, a portion of the inner surface covering each of the stationary magnets 140a and 140b defines a gentle streamlined surface 160a within a predetermined angular range at one side thereof and a vertical end surface 160b at the other side thereof. With this configuration, the stationary unit 120 approximately has a constant inner diameter with the exception of the streamlined surface 160a causing the stationary unit 120 to be tapered inward. Also, the respective streamlined surfaces 160a are configured so as not to be affected by magnetic force of the stationary magnets 140a and 140b, causing no disturbance in operation of the corresponding rotating unit 200.

The stationary magnets 140a and 140b are permanent magnets arranged in such a manner that identical polarities face each other. Also, to reduce magnetic attraction to the maximum extent, the stationary magnet is positioned and oriented in such a manner that the rotating magnet passes a lateral side thereof rather than a front side thereof. Generally, all kinds of magnets, including cylindrical magnets and the like, are designed to generate strong magnetic force at front and rear sides thereof. Accordingly, since a lateral side of a magnet exhibits less generation of magnetic force based on the polarities of the magnet and thus, may be formed of a shield material or non-magnetic materials. Accordingly, inventors of the present invention have naturally suggested restricting generation of unnecessary magnetic force to the maximum extent.

As illustrated in the accompanying drawings, preferably, the stationary magnet and rotating magnet have a U-shaped form and are arranged such that identical polarities of both the magnets, i.e. north-poles of both the magnets face each other to generate repulsive force.

The present invention has a feature in that the rotation power generating device accumulates torque in the same principle as a fly-wheel of an engine rotator, achieving inertial force to allow the accumulated torque to assist effective rotation. That is, when the rotation power generating device is connected to a power source and is initially rotated upon receiving torque, the device requires greater power at an initial rotation thereof, but may be efficiently rotated even using smaller power as the rotation thereof is continued.

The rotator 200, as described above, is constructed in such a manner that the plurality of rotating units 220 is vertically coupled one above another, with an angular orientation difference therebetween, about the rotating shaft 220a that is installed in the center of the stator 100. More specifically, as the rotating magnets 240a and 240b of the respective rotating units 220 are located at different angles relative to the stationary magnets 140a and 140b of the respective stationary units 120, the rotator 200 may be under the continuous action of repulsive force between the rotating and stationary magnets arranged such that identical polarities face each other.

In this case, each of the rotating units 220 is coupled to the rotating shaft 200a such that the pair of rotating magnets 240a and 240b is rotated along the inner surface of the corresponding stationary unit 120 with a constant gap from the inner surface. Ball bearings 260 are coupled to distal ends of the rotating unit 220, so as to be smoothly rotated respectively on the streamlined surfaces 160a while coming into close contact with the streamlined surfaces 160a. In addition, an elastic member 280 is provided to couple each of the rotating magnets 240a and 240b to the rotating shaft 200a. The elastic member 280 has a variable length with respect to the corresponding streamlined surface 160a. For this, as shown in the drawings, the elastic member 280 receives a spring 282 therein, thus being extendable or contractible to or from the corresponding streamlined surface 160a. Each rotating magnet 240a or 240b is arranged to face each stationary magnet 140a or 140b of the same polarity.

Accordingly, with the rotation power generating device having the above-described configuration, each stationary unit 120 and each rotating unit 220 will be operated as shown in FIG. 4. Specifically, when the rotating unit 220 is rotated along the inner surface of the stationary unit 120 with a gap from the inner surface by initial torque T, for example, repulsive force F between the stationary magnet 140b of the stationary unit 120 and the rotating magnet 240b of the rotating unit 220 is generated at the vertical end surfaces 160b of the stationary unit 120. The repulsive force F is greater than frictional loss f caused when the ball bearing 260 associated with the other symmetric rotating magnet 240a comes into close contact with the streamlined surface 160a of the stationary unit 120, enabling smooth rotation of the rotating unit 220.

Of course, in the above-described operation, although repulsive force F' between the stationary magnet 140a and the rotating magnet 240a is generated on the streamlined surface 160a which is also under the influence of the frictional loss f as described above, the repulsive force F is smaller than the initial torque T.

In conclusion, a sum of the initial torque T and the repulsive force F between the stationary magnet 140b and the rotating magnet 240b is greater than a sum of the repulsive force F' between the stationary magnet 140a and the rotating magnet 240a and the frictional loss f on the streamlined surface 160a and therefore, the rotating unit 220 may achieve smooth rotation thereof.

In the present invention, the rotating unit 220 is connected to the rotating shaft 200a using a pair of the elastic members 280, in each of which the spring 282 is installed. In this case, in a state wherein one half part of the rotating unit 220 at one side of the rotating shaft 200a has a reduced length L1 as it moves on the streamlined surface 160a and thus, and the other half part of the rotating unit 220 at the other side of the rotating shaft 200a has an increased length L2 by elasticity of the spring 282, the longer half part of the rotating unit 220 may compensate for the frictional loss f due to the streamlined surface 160a based on the seesaw principle because identical polarities of the stationary magnet and rotating magnet, i.e. the north-poles of both the magnets act to push each other.

In the present invention, the respective rotating units 220 are coupled with the respective stationary units 120 such that the rotating units 220 are vertically stacked one above another with an angular orientation difference therebetween. Therefore, the above-described operation may be successively accomplished at a constant time interval and consequently, this may reduce energy loss to the maximum extent while achieving successive rotations.

Meanwhile, the pair of symmetric stationary magnets 140a and 140b of each stationary unit 120 and the pair of symmetric rotating magnets 240a and 240b of the corresponding rotating unit 220 are offset at positions deviated by a predetermined range from accurately symmetric positions thereof. Specifically, as shown in FIG. 4, the stationary magnet 140a and rotating magnet 240a are offset from the other stationary magnet 140b and rotating magnet 240b by a predetermined range.

In another embodiment of the present invention, as shown in FIG. 5, a blower fan 300 may be coupled to one end of the rotating shaft 200a at one distal end of the stator 100. The blower fan 300 serves not only to assist smooth rotation of the rotating shaft 200a, but also to lower the interior temperature.

The rotation power generating device of the present invention may be utilized in an application as shown in FIG. 6. In the shown application, a power source to provide initial torque is coupled to one distal end of the rotating shaft 200a of the rotor 200, and an electric generator to generate electricity using rotation power is coupled to the other distal end of the rotating shaft 200a. This application enables effective energy production using, e.g., natural energy. In other words, if the rotation power generating device is rotated using wind velocity or water vapor as natural energy, the rotation power generating device according to the present invention may achieve rotation power required to drive the generator with the maximally reduced loss of initial torque, resulting in remarkable enhancement in energy production efficiency.

Here, the stator is made of a non-magnetic material, such as nonferrous metals, synthetic resins, aluminum alloys, etc., so as to be free from the influence of magnetic force.

In the rotation power generating device according to the present invention, it is preferred to increase a length of the rotating shaft, so as to maximize the magnitude of center axis power. In addition, it is preferred to increase a length of the rotating unit, so as to allow the rotating unit to easily pass the streamlined surfaces where the stationary magnets are located.

As apparent from the above description, the present invention provides a rotation power generating device, which may compensate for energy loss of initially acting torque using repulsive force between magnets of the same polarity. This may reduce power loss, enabling more effective transmission of energy.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A rotation power generating device comprising:
   a stator including a plurality of stationary units shaped into rings of the same diameter and vertically connected to one another, each of the stationary units having a pair of stationary magnets embedded inside an inner surface thereof at symmetric positions such that identical polarities face each other, a portion of the inner surface covering each stationary magnet installed to protrude inward defining a gentle streamlined surface within a predetermined angular range at one side thereof and a vertical end surface at the other side thereof; and
   a rotator including a plurality of rotating units vertically connected to one another with an angular orientation difference therebetween and each having a pair of rotating magnets arranged to face the corresponding stationary magnets of the same polarity so as to be rotated along the inner surface of the corresponding stationary unit, with a gap from the inner surface, about a rotating shaft that is installed in the center of the stator, each of the rotating magnets being provided at a distal end thereof with a ball bearing to be smoothly rotated on the streamlined surface in close contact therewith, and being connected to the rotating shaft via an elastic member in which a spring is installed.

2. The device according to claim 1, further comprising a power source to provide initial torque is coupled to one distal end of the rotating shaft of the rotor, and a generator to generate electricity using rotation power is coupled to the other distal end of the rotating shaft.

3. The device according to claim 1, wherein the pair of symmetric stationary magnets of each stationary unit and the pair of symmetric rotating magnets of the corresponding rotating unit are offset at positions deviated by a predetermined range from accurately symmetric positions thereof.

4. The device according to claim 3, further comprising a power source to provide initial torque is coupled to one distal end of the rotating shaft of the rotor, and a generator to generate electricity using rotation power is coupled to the other distal end of the rotating shaft.

5. The device according to claim 1, wherein a blower fan is coupled to one end of the rotating shaft at one distal end of the stator.

6. The device according to claim 5, further comprising a power source to provide initial torque is coupled to one distal end of the rotating shaft of the rotor, and a generator to generate electricity using rotation power is coupled to the other distal end of the rotating shaft.

7. The device according to claim 1, wherein the corresponding stationary magnet and rotating magnet are arranged such that N-poles or S-poles of both the magnets face each other.

8. The device according to claim 7, further comprising a power source to provide initial torque is coupled to one distal end of the rotating shaft of the rotor, and a generator to generate electricity using rotation power is coupled to the other distal end of the rotating shaft.

9. The device according to claim 1, wherein the rotating unit, which is connected to the rotating shaft using a pair of the elastic members, in each of which the spring is installed, has a variable length such that one half part of the rotating unit at one side of the rotating shaft has a reduced length as it moves on the streamlined surface, and the other half part of the rotating unit at the other side of the rotating shaft has an increased length by elasticity of the spring, whereby the longer half part of the rotating unit compensates for frictional loss due to the streamlined surface based on the seesaw principle because identical polarities of the corresponding stationary magnet and rotating magnet, i.e. north-poles of both the magnets act to push each other.

* * * * *